May 23, 1961 N. GRUBELIC 2,985,331
DEVICES FOR APPLYING STAMPS FROM A STRIP TO ENVELOPES
Filed Jan. 7, 1959 6 Sheets-Sheet 1

INVENTOR.
NICHOLAS GRUBELIC
BY
J.B. Felshin
ATTORNEY.

United States Patent Office 2,985,331
Patented May 23, 1961

2,985,331

DEVICES FOR APPLYING STAMPS FROM A STRIP TO ENVELOPES

Nicholas Grubelic, Williston, N.Y., assignor, by mesne assignments, to Nicholas Grubelic, Williston Park, N.Y.

Filed Jan. 7, 1959, Ser. No. 785,469

13 Claims. (Cl. 216—30)

This invention relates to devices for applying stamps from a strip to envelopes.

One object of the present invention is to generally improve the structure disclosed in my co-pending application Serial No. 644,274, filed on March 6, 1957, now Patent No. 2,952,375, issued September 13, 1960 for Device for Moistening Envelope and Cutting and Applying the Cut Stamp to the Envelope.

Another object of this invention is to provide in a device of the character described, a removable water tank whereby to facilitate adding water to the tank when it is dry.

Yet another object of this invention is to provide in a device of the character described, means to feed the stamps in such a way that they are applied to the envelope with the upper edge of the stamp adjacent the upper edge of the envelope.

Still a further object of this invention is to provide in a device of the character described, means to feed the stamps horizontally to the applicator, so that the applicator may come straight down after the stamp is cut, to apply the stamp to the envelope.

Still a further object of this invention is to provide in a device of the character described, means for pulling the stamps from a roll and feeding the pulled stamps to the applicator.

Still another object of this invention is to provide in a device of the character described, means to position the envelope in a first position so that a first stamp may be applied to the envelope on one part of the envelope, and in a second position so that a second stamp may be applied to a second portion of the envelope next to the first stamp.

A still further object of this invention is to provide in a device of the character described, a wiper which normally projects against a wick in the water tank, and manual means for lifting the wiper, to facilitate removal of the tank, and further means for holding the removable tank in the device. The tank, made in accordance with the present invention, is transparent so that the user can see how much water is left in the tank.

Yet a further object of this invention is to provide a strong, rugged, and durable device of the character described, which shall be relatively inexpensive to manufacture, easy to manipulate, sure and positive in operation, and yet practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention.

Fig. 11 is a cross-sectional view taken along line 11—11 of Fig. 10a;

Referring now in detail to the drawing, 10 designates a machine for adhering stamps to envelopes. The device 10 comprises a frame support 10a on which is mounted an enclosing cover casing C. Casing C has side walls, a rear wall and a top wall. It has a front swingable door C'. The rear wall has a cut-out or opening C'' at its lower end. The side walls are cut away at their lower front corners as at C'''. Said support comprises a base plate 11, which may be rectangular in shape. Attached to the corner of the underside of the base plate 11, in any suitable manner, are rubber bumpers or legs 12, or the like supporting means. Attached to the top of the base, adjacent the forward end thereof, is a U-shaped base member 13 of uniform height and comprising a front wall 14, adjacent the front edge 11a of the base plate, and side walls 15 and 16, located adjacent, but somewhat spaced inwardly, from the side edges 11b and 11c of the base plate.

Mounted on base plate 11, and against the inner surface of front wall 14, is a thick plate 14a attached to the base plate 11 in the manner hereinafter appearing. Member 14 is attached to the plate 14a by means of screws 14b, extending through openings in the side walls 15 and 16, and screwed into the ends of said plate. The member 13 may be about one inch in height and has upper edges spaced above the base plate.

Figure 9:
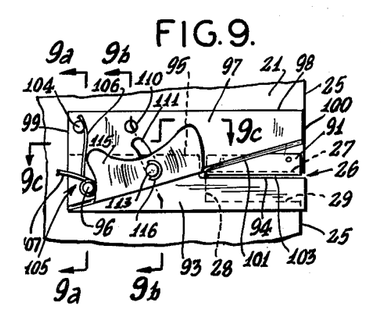
Fig. 9 is a cross-sectional view taken along line 9—9 of Fig. 1.
Figure 9A:
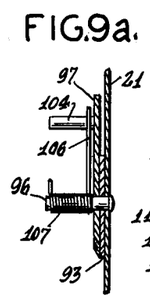
Fig. 9a is a cross-sectional view taken along line 9a—9a of Fig. 9.
Figures 9B, 9C:
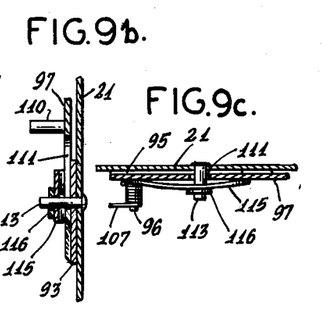
Fig. 9b is a cross-sectional view taken along line 9b—9b of Fig. 9.
Fig. 9c is a cross-sectional view taken along line 9c—9c of Fig. 9.

Fixed to the top of the base plate 11, and extending upwardly therefrom, is a vertical bracket 17. Bracket 17 comprises a bottom flange 18 attached to the base plate by screws 19. The flange 18 is parallel to the side edges of the base plate and spaced substantially medially therefrom. Extending upwardly from the flange 18 is a vertical wall 20, from which extends a somewhat offset vertical wall 21. The vertical wall 21 has a top edge 22. At the forward end of the top edge 22 is a vertical downwardly extending edge 23, from which extends forwardly a horizontal edge 24. Extending downwardly from the forward end of edge 24 is a front vertical edge 25. The wall portion 21 is formed with a notch 26 extending rearwardly from the front edge 25, about an inch above member 13. Notch 26 forms an upper edge 27 (Fig. 9), a rear edge 28, and a lower edge 29. The edges 27 and 29 are horizontal. The rear edge 28 is vertical as shown in Fig. 9 of the drawing.

Figure 14:
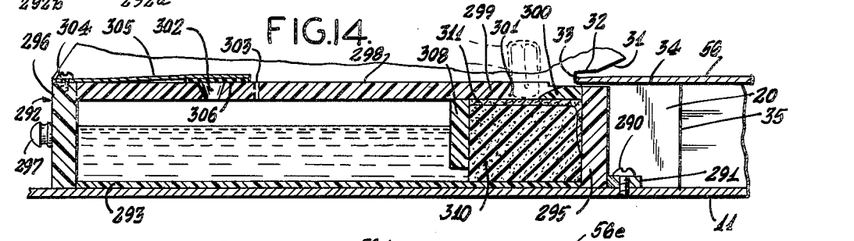
Fig. 14 is a cross-sectional view taken along line 14—14 of Fig. 13.
Figure 14A:
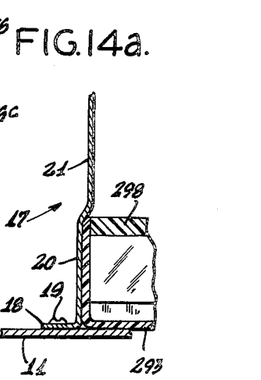
Fig. 14a is a cross-sectional view taken along line 14a—14a of Fig. 13.

Below the notch 26, edge 25 continues downwardly, until it is interrupted by a notch 30 (Fig. 4), forming a rearwardly and downwardly inclined edge 31, from which extends a rearwardly extending horizontal edge 32. Extending downwardly from the rear end of the edge 32 is a vertical edge 33, from which extends an upper edge 34 (Fig. 14). Extending downwardly from the forward end of the upper edge 34 is a forward end 35.

Extending from the rear end of the top edge 22 of bracket 17 is a downwardly and rearwardly inclined edge 37 (Fig. 14). Edge 37 extends down to the rear upper corner of wall 20.

Figures 7, 8:
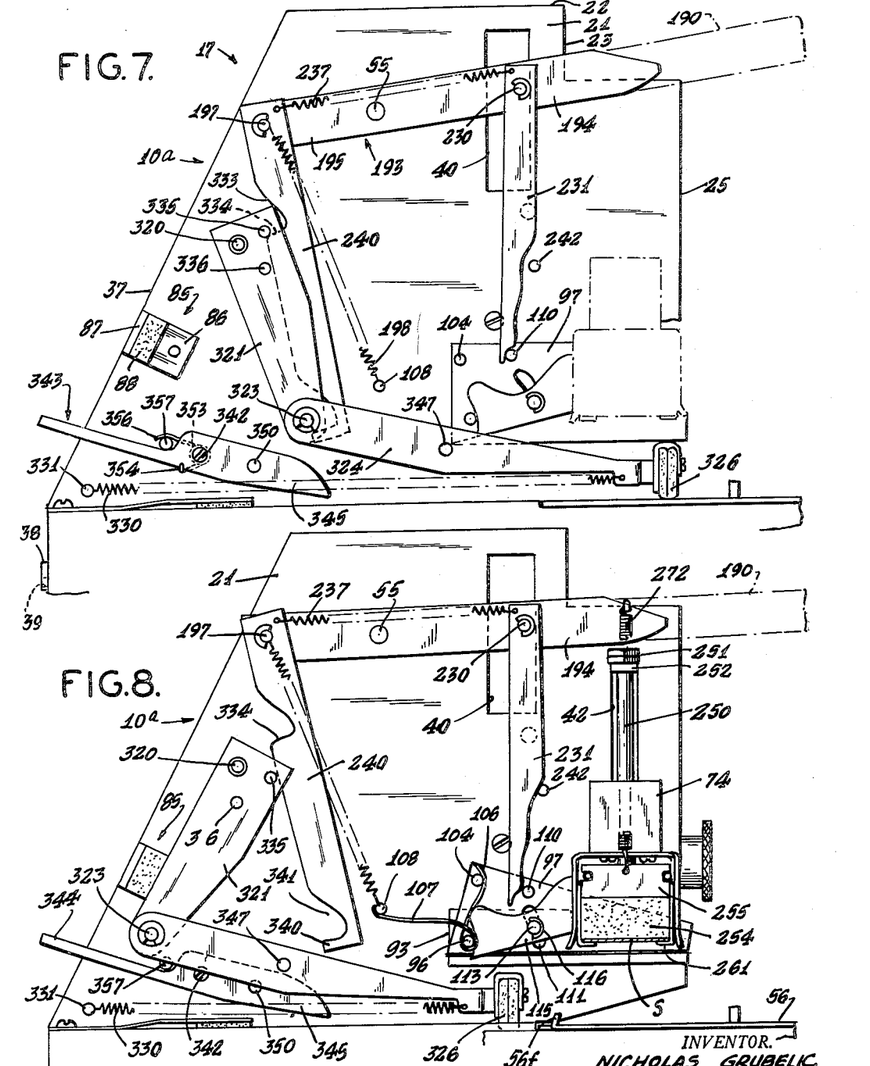
Fig. 7 is a partial view, similar to Fig. 4, but showing the operating handle partially pressed down.
Fig. 8 is a view similar to Fig. 7, but showing the operating handle pushed further down than in the position of Fig. 7.
Figure 13:
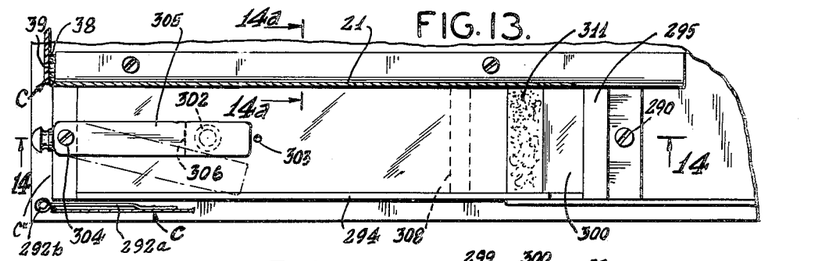
Fig. 13 is a cross-sectional view taken along line 13—13 of Fig. 4.

Wall 20 is formed at its rear end with an offset finger 38 (Fig. 13), provided with a threaded hole 39, for attaching rear wall of cover C. Wall 21 is formed with a rectangular vertical slot 40, adjacent the top edge 22, and rearwardly of the edge 23 of wall 21 (see Figs. 7 and 8). Wall 21 is also formed with a through opening 41, disposed below the edge 22, and rearwardly of the slot 40. Said wall 21 is furthermore formed with a vertical slot 42, disposed adjacent the vertical edge 25, and below the horizontal edge 24 of wall 21.

Figures 2, 3, 4A:
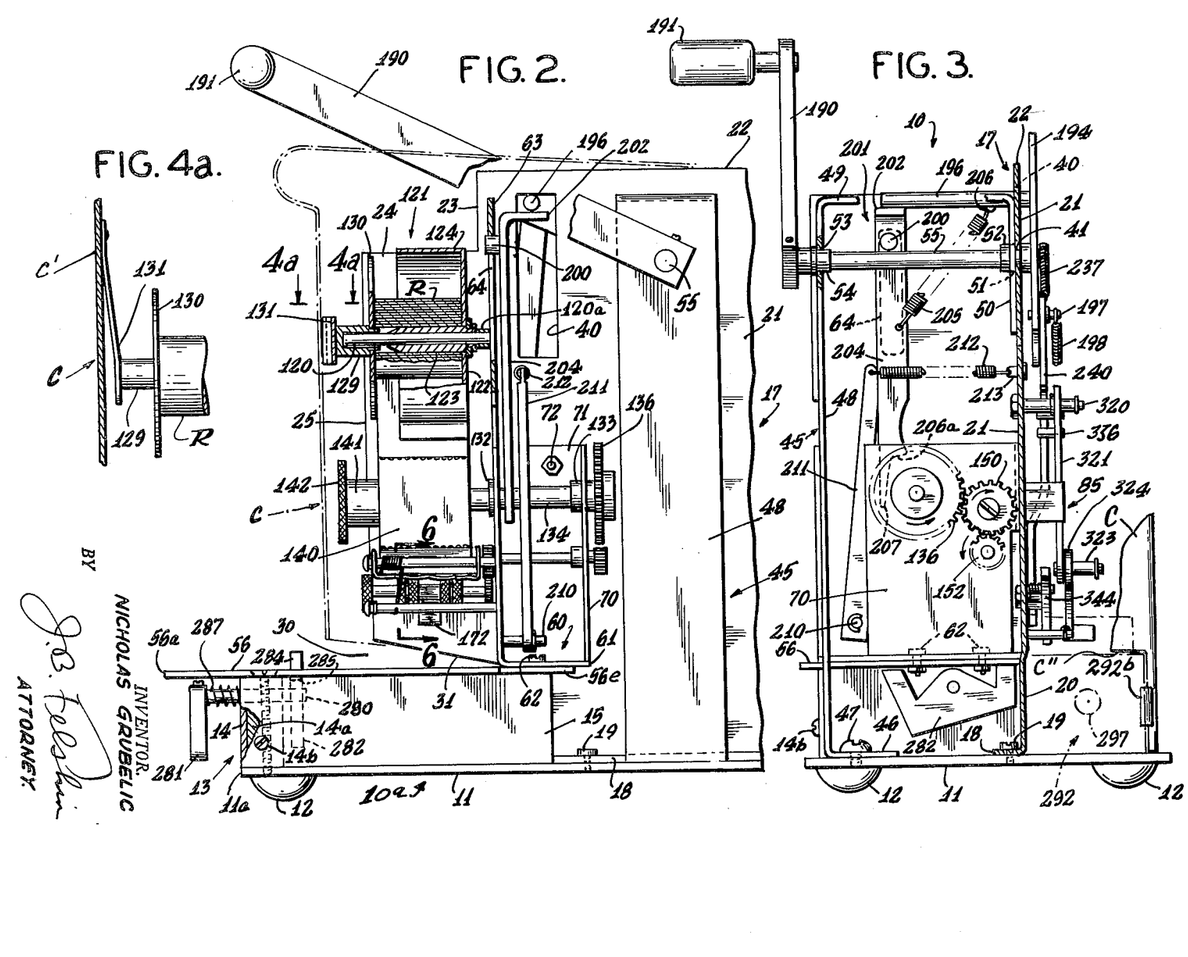
Fig. 2 is a front elevational view of the structure shown in Fig. 1.
Fig. 3 is a rear elevational view of the structure shown in Fig. 1.
Fig. 4a is a cross-sectional view taken along line 4a—4a of Fig. 2.

Attached to the top of base plate 11 is a bracket 45 (see Figs. 2 and 3). Bracket 45 has a foot 46 lying on top of the base plate and attached thereto by a screw 47. Extending upwardly from the foot 46 is a vertical wall 48. Extending from the upper end of the wall 48 is a horizontal wall 49, from which extends downwardly a vertical wall 50, contacting one side of wall 21, and fixed thereto by spot welding, or in any other suitable manner. Wall 50 is formed with an opening 51 registering with the opening 41 in wall 21. In opening 51 is a bearing member or bushing 52. In wall 48 is an opening 53, supporting a bushing 54, aligned with the bushing 52. Extending through said bushings, and through opening 41, is a transverse shaft 55, for the purpose hereinafter appearing. It will be noted that the top wall 49 of bracket 45 is located somewhat below top edge 22 of wall 21.

Figure 15:
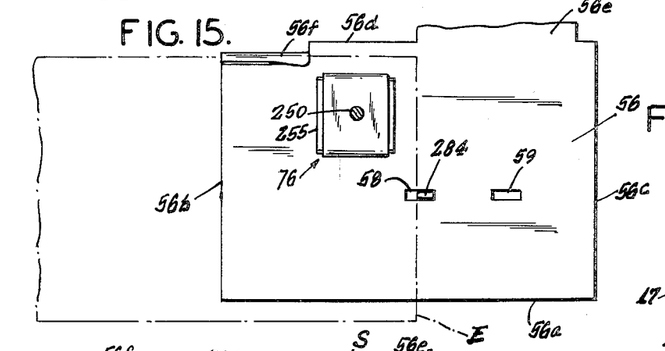
Fig. 15 is a cross-sectional view taken along line 15—15 of Fig. 1, and showing the envelope-positioning means in position to receive a first stamp.

Mounted on the top edge of member 13 is a horizontal envelope-supporting plate 56. Plate 56 is generally rectangular in shape. It has a front edge 56a, disposed forwardly of wall 14 of member 13. Plate 56 has parallel side edges 56b and 56c, disposed beyond the side walls 15 and 16 of member 13. Said plate 56 projects into the notch 30 of wall 21, and overlies the edge 34. Said plate 56 has a rear edge 56d contacting the rear edge 33 of notch 30 (see Fig. 14). Said plate 56 also has a rearwardly extending plate portion 56e at the right side of edge 56d, looking rearwardly (as shown in Fig. 15 and Fig. 4a). Said plate 56 is formed at the left side, looking rearwardly, with an upwardly and forwardly inclined lip 56f adapted to engage the upper edge of an envelope placed on plate 56.

Said plate 56 is assembled with plate 14a and the base plate 11 by screws 57, which pass through openings in said plates and are screwed into threaded openings 57a in the base plate. Said plate 56 is furthermore formed, rearwardly of wall 14, with a pair of aligned slots or openings 58 and 59. The distance from the left end of slot 58 to the left end of slot 59 is substantially equivalent to the width of an ordinary normal-sized postage stamp, such as, for example, the ordinary present day 4¢ U.S. stamp. The slots 58 and 59 are parallel to the front edge 56a of plate 56. The left end of slot 58 is substantially in alignment with the plane of wall 21. Said slots are furthermore spaced forwardly of the front edge 25, of said wall 21.

Fixed to the top of plate portion 56e is a bracket 60, having a rearwardly extending foot or flange 61, contacting said wall portion and attached thereto by screws 62, or in any other suitable manner. Extending upwardly from foot or flange 61 is a vertical wall 63. One edge of bracket 60 contacts one side of wall 21. Wall 63 is located forwardly of slot 40 (as shown in Fig. 2). Said wall 63 is formed with a vertical slot 64, adjacent the outer edge 65 of said wall, and below the upper edge 66 of said wall (see Fig. 1).

Extending upwardly from the rear edge of foot 61 is a vertical wall 70, parallel to wall 63, terminating therebelow. Extending from one edge of wall 70 is a flange 71 fixed to wall 21 by a bolt 72.

Figure 1:
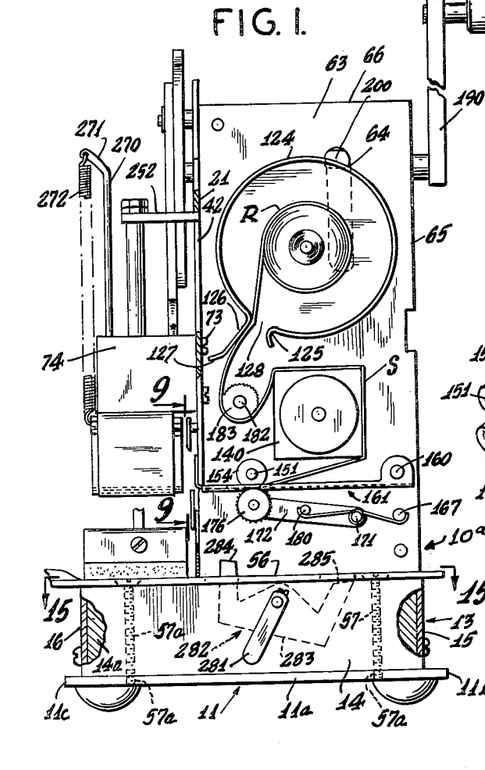
Fig. 1 is a front elevational view of a device embodying the invention with the cover removed.
Figures 10, 10A:
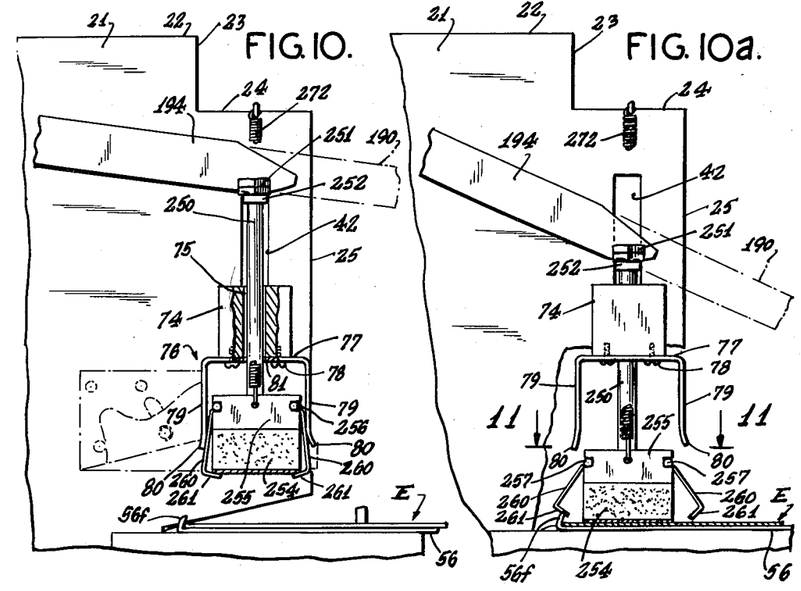
Fig. 10 is a side elevational view of the applicator showing the same in partially depressed condition.
Fig. 10a is a view similar to Fig. 10, but showing the applicator fully depressed.

Fixed to wall 21, as by screws 73, is a block 74 (see Figs. 1 and 10). Block 74 is formed, for the purpose hereinafter appearing, with a vertical through-opening 75. Said block is located just below the lower end of slot 42. Attached to the lower side of the block 74 is a cage 76, having a top wall 77, attached to the underside of the block 74, as by screws 78. Extending downwardly from the front and rear ends of walls 77 are spring arms 79, having outwardly curved fingers 80 at their lower ends (see Figs. 10 and 10a). Wall 77 is formed with an opening 81 registering with the through-opening 75 in block 74.

Attached to wall 21, adjacent the inclined edge 37, is an angle bracket 85 (Figs. 4, 7 and 8), having a flange 86, fixed to said wall, and an inclined flange 87, at right angles thereto. Attached to the inner side of flange 87 is a block or stop pad 88 of rubber-like shock absorbing material (see Fig. 7).

Attached to wall 21 is an angle-shaped guide member 90 (see Figs. 6 and 9), having a flange 91 contacting wall 21, and a flange 92 passing through slot or notch 26 and engaging the upper edge 27 of said notch.

Fixed to said wall 20, at the left side of said wall, looking rearwardly, is a plate 93 (Figs. 6 and 9), which is preferably made of steel. Said plate 93 has an upper edge 94, spaced below the horizontal flange 92 of angle-shaped member 90. Edge 94 constitutes a shearing edge, as will appear hereinafter. The rear end of plate 93 extends to a horizontal edge 95, somewhat above the level of the edge 94.

Attached to wall 21 is a fixed pivot pin 96, passing through the rear end of plate 93. Pivoted to said pivot pin 96, and contacting an outer surface of plate 93, is a cutting blade 97. Said cutting blade 97 (as shown in Fig. 9), when in normal condition, has an upper horizontal edge 98, a rear vertical edge 99, and a front edge 100. It is also formed with a lower upwardly and forwardly inclined cutting edge 101. The cutting edge 101 substantially intercepts the rear end of edge 94 of plate 93, and is, hence, located at the rear end of flange 92 of angle-shaped member 90. It will be noted that a slot 103 is formed between the upper edge 94 of plate 93 and the underside of flange 92 of angle-shaped member 90, for the purpose hereinafter appearing.

On the plate 97, and adjacent the junction of edges 98 and 99, is a stop pin 104. On pivot 96 is a torsion spring 105, having one arm 106 engaging stop pin 104, and having a second arm 107, engaging a fixed pin 108 on wall 21, located rearwardly of plate 93 (see Figs. 4 and 8). It will now be understood that after the plate 97 has been pivoted in a clockwise direction, looking at Fig. 9, in a manner hereinafter described, the torsion spring 105 will move the blade back to normal position when said blade is released. For the purpose hereinafter appearing, there is fixed to said blade 97 a pin 110, located forwardly of the stop pin 104. The blade 97 is, furthermore, formed with an arcuate slot 111, having its center of curvature at the pivot pin 96 (see Fig. 4).

Fixed to wall 21 is a pin 113, projecting through the slot 111. On pin 113 is a butterfly spring 115, held thereon by C-clamp 116, received in a suitable groove in said pin. The spring 115 has wings pressing the blade 97 against the plate 93 and flange 91 of angle-shaped member 90. As will appear hereinafter, stamps are fed through the slot 103, and these stamps may be severed by actuation of the blade 97.

Attached to wall 63 of bracket 60, and extending forwardly therefrom, is a fixed pin 120 located to the left of slot 64 and near the lower end of said slot (see Fig. 2). Received on the pin 120 is a cage 121, for a roll R of stamps. The cage 121 has a circular back wall 122, carrying a central forwardly extending sleeve 123, formed with a through-opening through which the pin 120 passes. On pin 120 is a spaced sleeve 120a interposed between cage 121 and wall 63. Extending forwardly from the rear wall 122 is a circular split wall 124 (see Figs. 1 and 2). At one end of wall 124 is a curved flange 125, located to the left of the bottom end of said wall. Extending from the other end of circular wall 124 is a downwardly and forwardly inclined edge 126, provided with an outer lip 127, and forming a slot or opening 128, through which the strip from the roll R may pass (as shown in Fig. 1 of the drawing).

Received on a front end of the fixed pin 120 is a hub 129, fixed to a cover disk 130. Cover disk 130 may be held in contact with the front end of the roll R by means of a leaf spring 131, fixed to the inside of the front door C' of cover casing C when the door is shut.

Walls 63 and 70 are provided with aligned bushings 132 and 133, respectively, supporting a horizontal rotary shaft 134, extending forwardly of wall 63 and rearwardly of wall 70. Fixed on the rear end of shaft 134 is a pinion 136. Fixed on the front end of shaft 134, in front of wall 63, is a square block 140. A cap 141 may be fixed to the front end of the shaft 134 for manually rotating the shaft. Said cap 141 may be formed with a knurled handle 142 at its front end. Fixed to shaft 134, and located rearwardly of wall 63, is a square disk 143, aligned with the square block 140. Fixed to the forward face of disk 143 are four pins 144, located equal radial distances from the axis of the disk, and spaced apart 90° from each other.

Rotatively mounted on wall 70 is a pinion 150, meshing with the pinion 136. Rotatively mounted in suitable bearings in walls 63 and 70 is a horizontal shaft 151. At one end of shaft 151 is a pinion 152, meshing with pinion 150. On said shaft and located forwardly of wall 63 is a pinion 153. On the forward end of said shaft is a rubber, or rubber-like, friction sleeve 154, which rotates with said shaft. Said sleeve 154 is located just rearwardly of and above the flange 92 of angle-shaped member 90.

Figure 6:
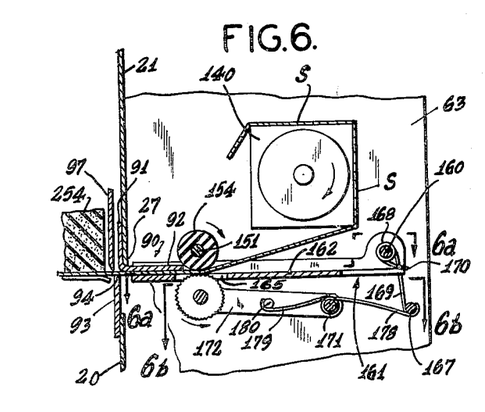
Fig. 6 is a cross-sectional view taken along line 6—6 of Fig. 2.
Figure 6A:
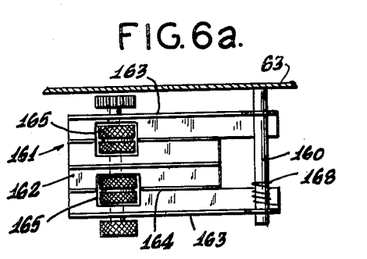
Fig. 6a is a cross sectional view taken along line 6a—6a of Fig. 6.

Fixed to wall 63, and extending forwardly therefrom, at the right side of and just below the square block 140, is a pin 160 (Figs. 1, 6 and 6a). Pivoted to said pin 160 is a guide plate 161. The guide plate 161 has a bottom wall 162 and side flanges 163. It is also formed with longitudinal spaced depressed grooves 164. The bottom wall 162 is formed with a pair of rectangular spaced openings 165.

Figure 6B:
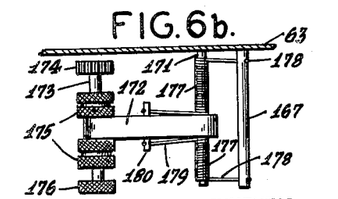
Fig. 6b is a cross-sectional view taken along line 6b—6b of Fig. 6.

Fixed to wall 63, and disposed below the pin 160, is a fixed pin 167 (Figs. 6 and 6b). Disposed about pin 160 is a torsion spring 168, having one arm 169 engaging fixed pin 167, and a second arm 170 engaging the rear end of said member 161. The torsion spring 168 tends to rotate member 161 in a clockwise direction, looking at Fig. 6 of the drawing, to bring the outer end of said member toward flange 92 of angle-shaped member 90. Fixed to said wall 63 is another fixed pin 171, disposed below member 161. Pivoted to said pin 171 is an arm 172, carrying at its outer end a rotary shaft 173. On the rotary shaft 173 is a pinion 174, adapted to mesh with the pinion 153. On said shaft 173 are also a pair of knurled wheels 175, adapted to project through the openings 165 in member 161. At the forward end of shaft 173 is a knurled wheel 176. Disposed about fixed pin 171 are a pair of torsion springs 177, each having an arm 178 engaging the fixed pin 167 (see Figs. 6 and 6b), and a second arm 179 engaging a pin 180, in an intermediate portion of arm 172. The torsion springs 177 tend to rotate the pivoted arm 172 in a clockwise direction, looking at Fig. 6 of the drawing, to move the knurled wheels 175 through the slots 165. It will be noted that the knurled wheels 175 are disposed below, and in alignment with, the rubber roller or sleeve 154.

Fixed to said wall 63, and extending forwardly therefrom, and located between the block 140 and wall 21, is a pin 182. Rotatably mounted on the pin 182 is a knurled idler or guide roller 183 (see Fig. 1). As shown in Fig. 1, the strip of stamps from the roll R passes through the opening 128, and around beneath the guide roller 183, then over a top face of block 140, then in contact with an outer face of said block. The strip then passes beneath roller 154, and then between the bottom wall 162 and flange 92, and then through the slot 103. It will be noted that each stamp S from the roll of stamps R contacts one face of the block 140. The perforations are at the ends of said face at corners of the block. The strip is gripped between the roller 154 and the rollers 175. To thread the strip through the opening 103, the wheel 176 may be depressed against the tension of the torsion springs 177, and member 161 may be depressed against the tension of the torsion spring 168. The strip may then be passed beneath the flange 92 and through the slot 103. When stamps S engage flat surfaces of the block 140, the knife blade 97 will be located above a row of perforations between a pair of adjacent stamps.

Means is provided for advancing the strip of stamps a distance equal to the width of one stamp at a time. To this end there is fixed to the right end of shaft 55, looking rearwardly, a crank handle 190. The crank handle 190 is normally inclined forwardly and upwardly, and has an offset finger engaging portion 191 at its upper end. When the crank handle 190 is depressed, shaft 55 will be rotated in a counterclockwise direction, looking at Fig. 2. Fixed to the opposite end of shaft 55 is a lever 193, disposed at the left side of wall 21, looking rearwardly. Lever 193 normally is also inclined forwardly and upwardly. It has a forward arm 194 and a rearward arm 195. Fixed to an intermediate portion of arm 194 is a pin 196, which passes through the slot 40, and is normally located at the upper end of the slot. Fixed to the rear or lower end of the lever 193 is a pin 197. Interconnecting pin 197 with the fixed pin 108 (see Fig. 4) is a coil tension spring 198. Thus when the handle 190 is depressed, spring 198, which is normally inclined upwardly and rearwardly, will be tensioned to move the handle and lever 193 back to normal positions when pressure is removed from the handle.

Slidably mounted in slot 64, and normally located at its upper end, is a pin 200. Fixed to said pin, and contacting the rear surface of wall 63, is a lever 201. Lever 201 has a rearwardly offset upper arm 202, contacting the underside of the pin 196. Said lever 201 has a downwardly extending arm 204, interconnected by a coil tension spring 205 to a pin 206, at the corner of wall 63 adjacent wall 21. Thus, the spring 205 tends to rotate the lever 201 in a counterclockwise direction, looking at Fig. 3 of the drawing. The downwardly extending arm 204 of said lever is formed at its rear side with an under-shoulder 206a, and with a finger 207 extending downwardly therefrom. The under-shoulder 206a is adapted to engage, when the device is in normal position, with one of the four pins 144. It is an upper outer pin 144 which is engaged by such shoulder. Pivoted to a pin 210, fixed to the rear of wall 63, is an arm 211, the upper end of which, is interconnected by spring 212 to an anchor 213 fixed to wall 21. Arm 211 is on a vertical plane with the disk 143. It has an edge 214 engaging a vertical edge of said disk 143 to hold said edge in vertical position.

It will now be understood that as the handle 190 is depressed, the forward end of lever 193 will also move downwardly, thereby causing pin 196 to depress the lever 201, causing pin 200 to slidably move in the slot 64. During such action the shoulder 206a, engaging one of the pins 144 of the disk 143, will cause rotation of said disk in a clockwise direction, looking at Fig. 1. When the engaged pin moves below a horizontal diametric position, the next pin 144 will engage lever 204 and swing it outwardly, so that the shoulder 206a will slip off the pin it engages. As the disk is rotated, arm 211 will be swung upwardly, thereby tensioning spring 212. The disk will then continue rotating until it has rotated through 90°, at which position arm 211 will abut against an edge of the disk, and the disk will be held in exact angular position. The spring 205 will be tensioned to permit arm 204 to swing out. When the handle is released, and again moves upwardly, spring 205 will pull the lever 201 upwardly, causing the pin 200 to slide upwardly in the slot 64. As the disk 143 rotates, shaft 134 will be rotated through an angle of 90°, thereby causing the roller 154 and the rollers 175 to rotate in opposite directions for feeding a stamp through the slot 103. Since the stamps contact the faces of the block, one stamp will be fed through the slot 103. Thus the width of one stamp will be fed through the slot 103 for each operation of the machine.

Means is provided to operate the knife for cutting or severing the stamp which has been fed through the slot 103. To this end there is fixed to arm 194, of the lever 193, a pin 230 coaxial with, and extending in, an opposite direction to the pin 196. Pivoted to the pin 230, and extending downwardly therefrom, is an arm 231. Arm 231 may be held on the pin 230 by a C-clamp 232. The forward edge of arm 231 is formed at its lower end with a shoulder 233. Above the shoulder 233 is an edge portion 234, curved rearwardly, as at 235. The upper end of arm 231 extends above the pivot 233, as at 236. The end 236 is connected by a coil tension spring 237 with the upper end of a lever 240, pivoted to the pin 197, and which will be described hereinafter. The spring 237 tends to rotate lever 231 in a counterclockwise direction, looking at Fig. 4.

Fixed to the wall 21 is a fixed pin 242, contacting the edge 234 of arm 231. As the handle is depressed, arm 231 will move downwardly until the shoulder 233 contacts the pin 110 on the blade 97. Further downward movement of the handle will cause the blade to be rotated in a clockwise direction, looking at Fig. 4, for severing a stamp which has been previously fed through slot 103. As the handle is depressed further, and as the stamp is severed, pin 242 cams lever 231 in a clockwise direction to disengage pin 110, which permits the blade to be moved upwardly by the torsion spring 105. The arcuate slot 111 permits movement of the blade between proper angular limits.

Figure 11:
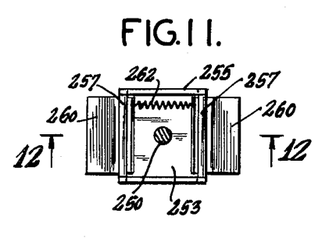

Means is provided to receive the fed stamp, and to hold the stamp as and after it is severed, and to bring the severed stamp down towards an envelope placed on the envelope-supporting plate 56. To this end, there is slidably mounted in the vertical through-opening 75, of fixed block 74, a rod 250. Attached to the upper end of rod 250, by means of lock nuts 251 screwed to a threaded extension on said rod, is a bar 252 passing through slot 42, and normally contacting the upper end of said slot. Screwed to the lower end of the rod 250 is a rectangular plate 253 (see Figs. 11 and 12), to the underside of which is attached a rubber-like applicator pressure pad 254. Extending upwardly from the sides of plate 253 are side walls 255, formed at the ends thereof, with notches 256. Received in the notches 256 are the ends of a pair of parallel pins 257.

Figure 12:
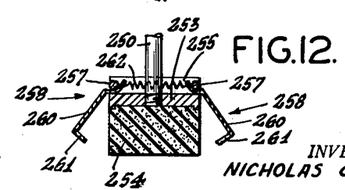
Fig. 12 is a cross-sectional view taken along line 12—12 of Fig. 11.

Attached to said pins 257 are wings 258, each comprising an upper inwardly curved arm 259, contacting and fixed to the inner side of one of said pins. Extending from each portion 259 is a flat portion 260. Extending from the lower end of each portion 260 is a finger of flange 261. The upper ends of the arm 259 are interconnected by a coil tension spring 262, as shown in Fig. 12. The spring 262 tends to rotate the wings 258 in opposite directions, to bring the portions 260 away from opposite sides of the applicator pad 254. However, when the rod 250 is in raised position, as shown in Fig. 10, the spring arms or legs 79 press the wings 258 inwardly toward each other against the tension of spring 262, to bring the fingers or flanges 261 beneath the block 254.

Fixed to block 74, and extending upwardly therefrom, is a rod 270 (see Fig. 1), bent to one side at its upper end, as at 271. Interconnecting portion 271 of rod 270, with one of the walls 255, is a coil tension spring 272, which tends to raise the applicator. The forward end of arm 194 of lever 193 engages the bar 252 when the handle is depressed to push down on the rod 250, and, hence, on the applicator, to bring the applicator below the spring arms 79, and permitting the wings 258 to spread. When pressure is released from the handle, the spring 272 will again raise the applicator, and cause the wings 258 to be swung inwardly toward each other. When the applicator is in its up position the space, between the flanges 261 and the underside of the rubber-like pad or block 254, is in a horizontal plane with the slot 103, so that a stamp fed through said slot will move beneath the pad 254, and the front and rear ends of the stamp will rest on the flanges 261. Thus, when the handle is moved down, the stamp, which has been fed to the applicator, will be severed, and then the applicator will move downwardly to press the severed stamp against an envelope E placed on the plate 56.

Figure 16:
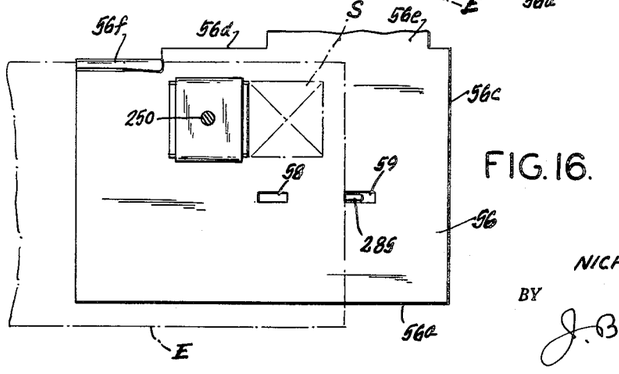
Fig. 16 is a view similar to Fig. 15, and showing the envelope-positioning means positioned for the envelope to receive a second stamp.

The envelope E may be placed on the plate 56 either in a first position, shown in Fig. 15, or in a second position, shown in Fig. 16. In the first position of Fig. 15, the envelope E receives a first applied stamp, and in the second position of Fig. 16, the envelope E receives a second applied stamp. In both the positions of Figs. 15 and 16, the upper edge of the envelope engages the upwardly hooked lip 56f.

Means is provided to properly position the envelope in either the position of Figs. 15 or 16. To this end front wall 14 of member 13, and plate 14a, are formed with registering openings, in which is journalled a horizontal shaft 280, disposed below the plate 56. Fixed to the front end of shaft 280 is a handle 281. Fixed to the rear end of said shaft 280 is a U-shaped rocker positioning member 282 having a bottom portion 283, and upstanding arms 284 and 285. Interposed between the handle 281 and the front wall 14, and received on shaft 280, is a coil spring 287. When the handle 281 is in the position of Fig. 1, arm 284 projects upwardly through slot 58. This is the position of Fig. 15. The right end of the envelope E will contact arm 284, and thus be positioned to receive a first stamp, the applicator then being located above the upper right hand corner of the envelope. After the first stamp has been applied, the handle 282 will be rotated in a counterclockwise direction, from the position of Fig. 1, bringing arm 284 downwardly below the slot 58, and bringing arm 285 upwardly through slot 59. The envelope may then be shifted to the right of position in Fig. 15 to the position of Fig. 16, contacting the arm 285, and the envelope will then be positioned to receive a second stamp.

Means is provided to moisten the envelope prior to applying each stamp, so that the stamp will adhere thereto. To this end there is fixed to the upper surface of base plate 11 and bottom walls 16 and 20, as by screw 290, a transverse stop bar 291. Mounted on said base plate 11 is a moistening tank 292 (see Figs. 4, 13 and 14). The forward end of the tank contacts the stop 291 and is located between walls 20 and 16. The tank 292 comprises a bottom wall 293, side walls 294, front wall 295, and rear wall 296. The rear end of the tank is exposed by the cut-out C″ in the rear wall of the casing C. Attached to the rear wall 296 is a knob or handle 297. Fixed to the inner surface of a side wall of casing C, adjacent the rear end thereof, is a leaf spring 292a extending rearwardly through cut-out C″ and having at its rear free end a head 292b projecting and releasably engaging the rear end of tank 292 to hold the tank against accidently slipping out.

Fixed within the upper end of the tank, and between side walls 294, is a top wall 298. The rear end of the top wall 298 contacts the upper end of the rear wall 296. The front end 299 of the top wall, terminates short of the front wall 295, and is bevelled downwardly and rearwardly. Fixed to the inner upper end of the front wall 295 is a tongue 300, having a downwardly and rearwardly bevelled upper surface. Between the end 299 and the tongue 300 is a space 301. The top wall 298 is formed with an inlet opening 302, through which water may be fed to the tank. The top wall 298 may also be formed with a vent opening 303, disposed forwardly of the inlet opening 302.

Fixed to the upper end of the rear wall 296, as by screw 304, is a spring tongue 305, to the underside of the front of which, is attached a pad 306. The tongue 305 may pivot sideways about the screw 304. In the full line position shown in Fig. 13, the pad 306 closes the inlet opening 302. When it is desired to pour water through the inlet 302, the tongue 305 may be pivotally moved sideways to the dot-dash position of Fig. 13, thus uncovering the inlet opening 302.

Fixed between the side walls 294, and contacting the undersurface of the top wall 298, is a baffle 308, the lower edge of which is spaced above the bottom wall 293, disposed within the tank. Between the baffle 308 and the front wall 295, is a block or wick 310 of wool felt, covered at the top by a piece of perforated chamois 311, contacting the undersurfaces of the top wall 298 and tongue 300. Thus water placed in the rear end of the tank will flow below the baffle 308 and moisten the block or wick 310 and keep it moist.

Means is provided to transfer water or moisture from the tank 292 to the portion of an envelope E placed on the envelope-supporting plate 56, which is to receive the stamp. To this end there is pivoted to wall 21, a pivot and somewhat rearwardly of the pivot pin 197, a pivot pin 320 (see Figs. 4, 7 and 8). Pivoted on the pivot pin 320 is a lever 321, inclined downwardly and rearwardly. The rear edge 322, of the lever 321, normally contacts the rubber-like block 88 of the stamp member 85. Pivoted to the lower end of arm 321, as on pivot 323, is a moistener arm 324, inclined forwardly and downwardly. Attached to the front end of lever 324 is a yoke 325, carrying a moistener wiper or pad 326, which may be made of wool felt or leather, covered by perforated chamois. In normal position, the wiper or pad 326, which projects downwardly from the yoke 325, enters the opening 301 and contacts the perforated chamois 311 of the wick 310. Water or moisture is thus transferred from the wick 310, 311, to the wiper pad 326. The front end of the moistener arm 324 is connected, by a coil tension spring 330, to a fixed pin 331, at the lower rear end of bracket 17. The spring 330, therefore, tends to pull back on the moistener arm 324 and to rotate the pivot arm 321 in a clockwise direction, looking at Fig. 4. The spring also tends to swing the moistener arm 324 downwardly, or in a clockwise direction, about the pivot 323.

Pivoted to the pivot pin 197, at the rear end of lever 193, is the lever 240, mentioned hereinabove. The spring 237 tends to rotate the lever 240 in a clockwise direction, looking at Fig. 4 of the drawing. Said lever 240 is formed with a notch 333 forming a shoulder 334 (see Figs. 7 and 8). Fixed to the lever 321, and offset from the pivot 320, is a pin 335, disposed within the notch 333, and resting on the shoulder 334, when the operating handle is in normal position (as shown in Fig. 4).

Figures 4, 5A, 5B, 5C:
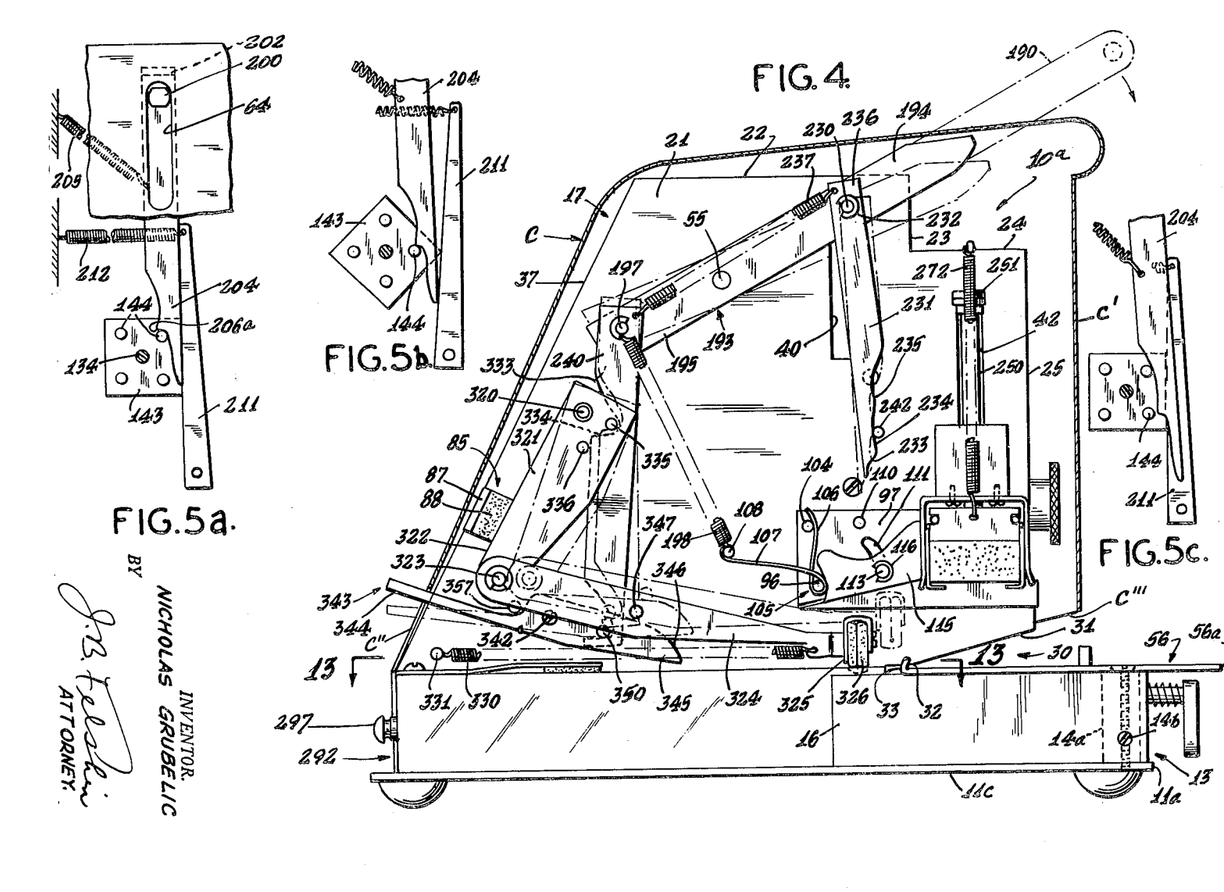
Fig. 4 is a view similar to Fig. 2 but showing the opposite side of the device.
Fig. 5a is a vertical view, illustrating the mechanism for rotating the stamp block in position, just prior to the rotation of the block.
Fig. 5b is a view similar to Fig. 5a, and showing the block partially turned.
Fig. 5c is a view similar to Fig. 5b, but showing the block fully turned.
Figure 5:
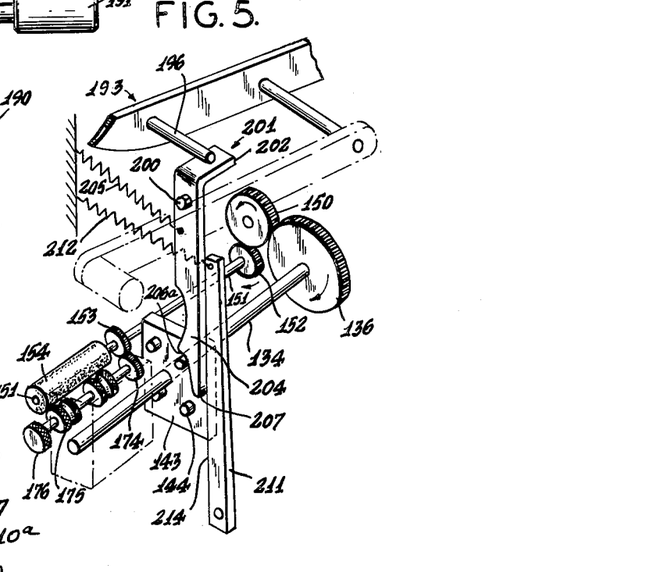
Fig. 5 is an exaggerated perspective view, illustrating the mechanism for rotating the stamp block, and the mechanism for feeding the stamps to the applicator.

Attached to said lever 321, below the pivot 320, is a pin 336, contacting a rear edge of the lever 240, when the operating handle is in normal position (likewise, as shown in Fig. 4 of the drawing). The pin 336 retains the lever 240 against swinging movement in a clockwise direction. At the lower end of lever 240 is a downwardly and rearwardly extending hook 340, forming a notch 341, above said hook. The function of hook 340 will be explained hereinafter.

Pivoted to wall 21 of plate 17, at a point below and to the right of the pivot point 323, when the latter is in normal condition, as on pivot pin 342, is a lever 343. Said lever 343 has an upwardly and rearwardly extending arm 344, projecting beyond the inclined edge 37 of bracket 17, and through opening C″ of cover casing C. Extending forwardly from the pivot point 343 is an arm 345, having an upwardly and rearwardly curved or cammed upper edge 346. Fixed to an intermediate portion of the moistener arm 324 is a pin 347, normally contacting the upper cammed edge 346 of lever 343, rearwardly of the forward end of said lever. Fixed to arm 345 of lever 343, and disposed rearwardly of the pin 347, when arm 324 is in normal condition, is a pin 350 which is engaged between the hook arm 340 of lever 240, when the machine is in normal inoperative position.

Disposed about the pivot pin 342 is a coil torsion spring 353, having one arm 354, engaging beneath arm 345 of lever 343, and a second arm 356, engaging a fixed pin 357, fixed to bracket 17. The torsion spring 353 normally tends to rotate the lever 343 in a clockwise direction. The pin 357 limits rotation of said lever in said direction, and also retains the pin 350 on the hook 340. When the operating handle is depressed, lever 193 is rotated in a clockwise direction raising lever 240, causing the hook 340 to lift arm 345 and lever 343, thereby lifting the moistener arm 324. At the same time shoulder 334, engaging the pin 335, causes lever 321 to be swung in a counterclockwise direction, looking at Fig. 4, to move the moistener arm forwardly. As the moistener arm moves forwardly, the moistener wiper pad 326 is dropped onto the envelope, and wipes across the portion of the envelope which is beneath the applicator, and which is to receive the stamp. As the lever 321 is swung in a counterclockwise direction, pin 336 swings lever 240 in a counterclockwise direction about its pivot pin 197, causing the pin 335 to slide off the shoulder 334, thereby permitting the spring 330 to pull back moistener arm 324 and lever 321 to normal position. The purpose of the lever 343 is to lift the moistener pad 326 up above the water tank, before moistener arm 324 is moved forwardly, to tension the spring 330.

The cover C which is placed over the mechanism, may have a suitable slot extension in opening C″ through which the rear end of arm 344 passes, so that said arm may be accessible, so that it can be depressed to raise the moistener arm, and, hence the moistener pad, whereby to permit removal of the water tank by engaging the knob 297, when it is desired to add water to the tank. Also the lever 343 may be manually actuated, when it is desired to replace the tank on the machine.

It will now be understood that the envelope is moistened before the applicator comes down and presses the severed stamp onto the moistened portion of the envelope. Furthermore, as the operating handle is released and moves back to normal position, all the parts go back to normal position.

It will thus be seen that there is provided an apparatus in which the several objects of this invention are achieved and which is well adapted to meet the condition of practical use.

As possible embodiments might be made of the above invention, and as various changes might be made in the embodiment above set forth, it is to be understood that all matter herein set forth or shown in the accompanying drawings is to be interpreted as illustrative and not in a limiting sense.

I claim:

1. In combination, a support, a horizontal shaft rotatably mounted thereon, a block of square cross-section fixed on said shaft and coaxial therewith, a square disk coaxially mounted on said shaft, and being provided with four pins spaced 90° apart, in complementary relation to the four corners of the block, said support being formed with a vertical slot, a pin slidable in said slot, a lever fixed to the pin and having a shoulder engaging selectively with said pins, an operating handle on said support, means connected to said operating handle to depress said pin and lever whereby to rotate said disk and shaft, a second shaft rotatably mounted on said support, means to connect said shafts for simultaneous rotation in the same direction, a guide plate pivoted to said support, a friction roller on said second shaft, said guide plate being formed with an opening disposed below said friction roller, and an arm pivoted to said support, disposed below said guide plate, and carrying a friction roller movable upwardly into said openings, whereby a strip of stamps engaging faces of said block may move between the friction roller and said pivoted plate, and whereby the portion of the stamp strip above the opening in the plate will be gripped by the friction rollers for feeding the strip, and spring means on said plate and on said arm to press the free end of the plate and the free end of the arm upwardly toward said friction roller.

2. In combination, a support, a block of square cross-section rotatively mounted on the support, means for rotating said block through an angle of 90°, a guide plate pivoted at one end to said support, being disposed below said block, and formed with an opening, a friction roller mounted for rotation above said opening, means to rotate said friction roller upon rotating said block, spring means to press the free end of the plate upwardly toward said friction roller, an arm pivoted to said support and disposed below said pivoted plate, a friction roller on said arm, projecting into said opening, to press a stamp strip passing from the block onto said plate and between said rollers, against said first friction roller, and spring means to press the roller on the free end of said arm upwardly into said opening.

3. The combination of claim 2, said guide plate having upwardly extending parallel side flanges.

4. The combination of claim 2, and said guide plate being formed with longitudinal grooves, in the upper surface thereof.

5. The combination of claim 2, said support being formed with a slot, adapted to receive the stamp strip passing beyond said plate, means to sever a stamp passing beyond said slot, a stamp applicator having means to releasably receive the stamp to be severed, and means for depressing the applicator downwardly to press the severed stamp against an envelope.

6. In combination, a wall formed with a horizontal slot, means for feeding a stamp strip through said slot a distance equivalent to the width of one stamp, a block fixed to said wall and formed with a vertical through-opening, a U-shaped yoke fixed to said block and having a pair of downwardly extending spaced spring arms, said yoke being formed with an opening registering with the through-opening in the block, a rod slidably mounted in said opening, means controlled by the stamp strip feeding means to depress said rod, a plate fixed to the lower end of the rod, a pair of wings pivoted to said plate, a compressible pad attached to the underside of said plate, said pad being so positioned that the fed stamp will be moved in the plane at the underside of said pad, said wings having fingers adapted to engage the side edges of the fed stamps, to hold the stamp against the underside of said pad, said spring arms being adapted to retain said wings in position where the stamp is held against the pad, spring means to bias the wings outwardly to disengage the stamp, whereby, when the rod is depressed, and the wings move below said spring arms, said wings will swing outwardly and release the stamp, so that the stamp may be pressed against an envelope.

7. In combination, a base, a support for an envelope on said base, a water tank mounted on the base, a wick in said water tank, said tank having an opening exposing said wick, and a moistening arm pivoted to said base, a wiping pad on said moistener arm contacting the exposed portion of the wick, an operating handle on said base, means controlled by said handle to cause said moistening arm to raise the wiping pad, wipe an envelope on the support, and move the pad back onto the wick, and means independent of the operating handle and pivoted to said base, and provided with a separate handle manually actuable, to raise the moistener arm for moving the moistener pad upwardly away from said wick without actuating the operating handle.

8. In combination, a frame, an operating handle pivoted to the frame, a lever fixed to the handle for rotation therewith, a second lever pivoted to the frame, a moistener arm pivoted at one end to the second lever, a moistener pad on said moistener arm, a third lever pivoted to the first lever and formed with a shoulder, a pin fixed to the second lever and engageable by the shoulder, whereas, upon operating said handle, said first lever will be rotated to lift the third lever for rotating the second lever, a pin on the moistener arm, a fourth lever pivoted to the frame and engaging the pin on the moistener arm, and a hook on the second lever engaging a pin on the fourth lever, to raise the fourth lever for raising the moistener arm.

9. The combination of claim 8, and means on the second lever, to rotate the third lever, for disengaging the shoulder of the third lever from the pin on the second lever.

10. The combination of claim 9, and spring means interconnecting the moistener arm with a portion of the frame, rearwardly thereof, for retracting said moistener arm.

11. The combination of claim 10, in combination with stop means, to limit pivotal movement of the second lever in one direction.

12. In combination, a supporting frame, a tank on said frame, a wick in said tank, a first lever pivoted to the frame, a moistener arm pivoted to said first lever and having a wiping pad in contact with said wick, a second lever pivoted to said frame, a third lever pivoted to said second lever and having means to releasably raise the moistener arm, means on the third lever to rotate the first lever, and means on the first lever to disengage the third lever from said moistener arm, and a fourth lever pivoted to said frame and having means to raise the moistener arm independently of the third lever.

13. In combination, a frame, means on the frame to support an envelope in predetermined position, a water tank removably mounted on the base and having an opening, a wick in said tank and below said opening, a moistener member having a pad projecting into said opening in contact with the wick, an operating handle on said support, means for feeding a stamp strip a distance equivalent to the width of one stamp, means releasably receiving the fed stamp, means to sever the said stamp after it has been received by said receiving means, means for raising the moistener arm to bring the pad out of said opening, and for moving the pad across a portion of the envelope below the stamp-receiving means, and means for depressing the stamp-receiving means and for releasing the stamp, so that the stamp is pressed against the moistened portion of the envelope, and means controlled by the operation of said handle, to actuate said feeding means, said severing means, said moistener arm raising means and pad-moving means and the depressing means for said stamp-receiving means, in combination with means, independent of the operating handle, and provided with a separate manually actuable handle, for raising the moistener arm, to remove the moistener pad from said opening, whereby to permit removal of the tank from the frame.

References Cited in the file of this patent

UNITED STATES PATENTS

| | | |
|---|---|---|
| 1,029,672 | Daniel et al. | June 18, 1912 |
| 1,072,262 | Ruszkowski | Sept. 2, 1913 |
| 1,194,692 | Allen | Aug. 15, 1916 |

FOREIGN PATENTS

| | | |
|---|---|---|
| 2,260 | Great Britain | Aug. 31, 1911 |